United States Patent Office 3,526,326
Patented Sept. 1, 1970

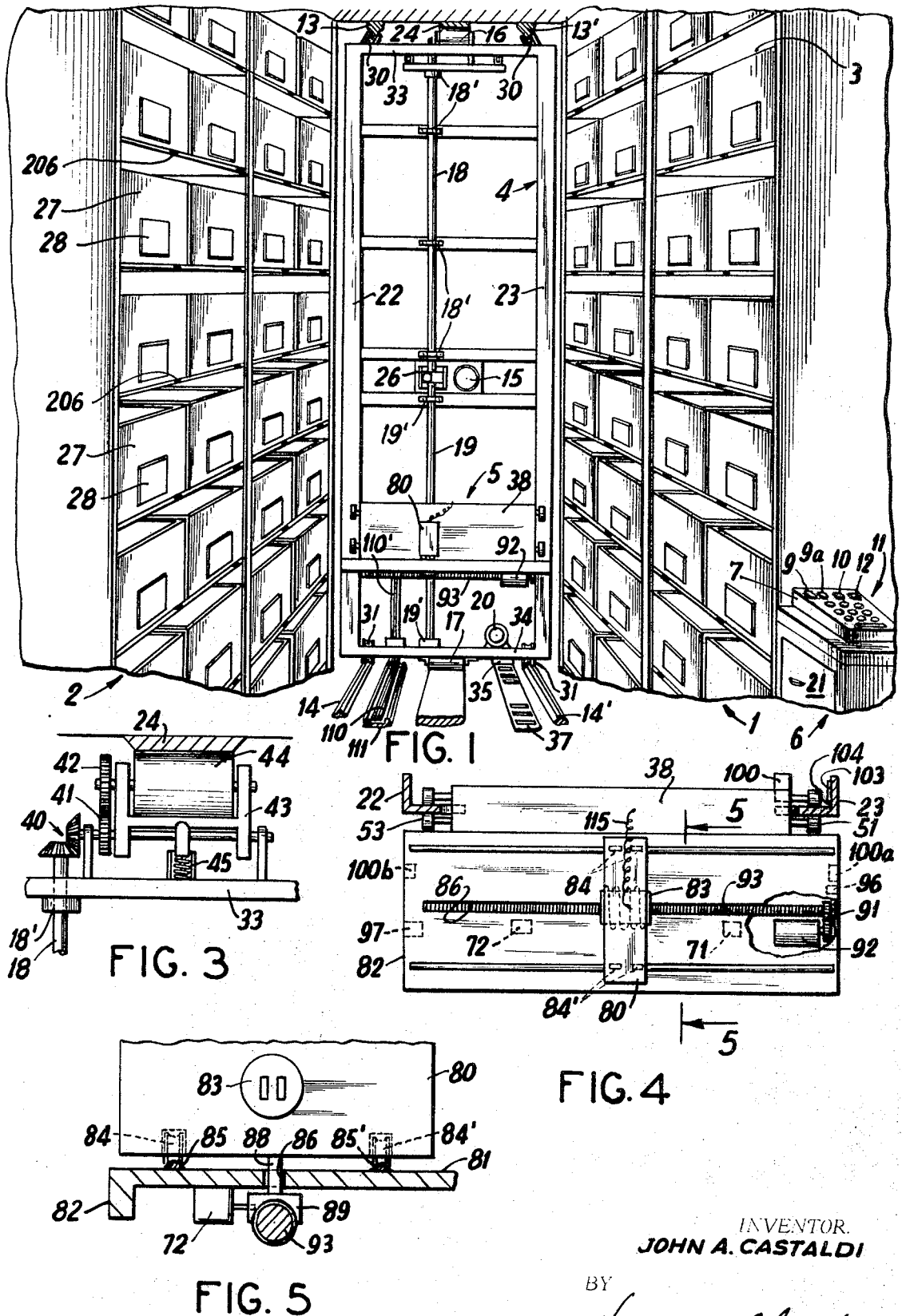

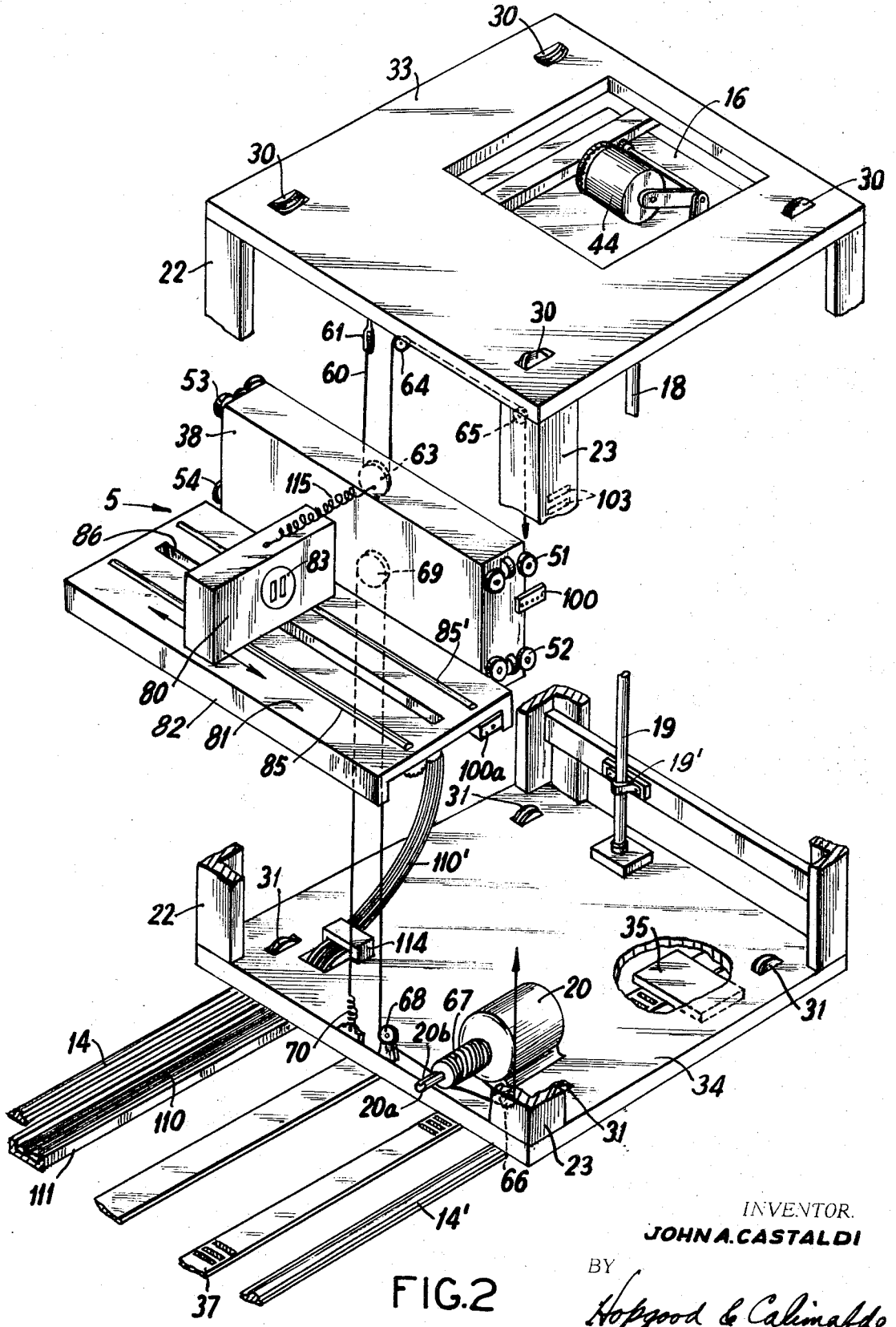

3,526,326
STORAGE RETRIEVAL APPARATUS WITH POSITIONAL CONTROL MEANS
John A. Castaldi, Brooklyn, N.Y., assignor to Supreme Equipment & Systems Corporation
Filed Mar. 4, 1968, Ser. No. 710,290
Int. Cl. B65g 1/00
U.S. Cl. 214—16.4          12 Claims

ABSTRACT OF THE DISCLOSURE

A search and retrieval system for locating objects accessible from a vertical plane, and delivering the same to a designated location. A motor driven carriage moving horizontally carries a retrieving platform, which moves vertically upon the carriage. Electro-optical scanners detect digital characters, sequentially arranged and associated with each storage bin, and relay the positions of the carriage and platform to command comparators, where an arithmetic comparison is made with digital destination signals supplied through a keyboard. Signals from the comparators actuate drive motors which move the platform opposite a desired position in a vertical X–Y plane. Digital "Slow" characters bracket each position and cause the carriage and platform to slow upon approaching a selected bin. Digital "Stop" characters cause the carriage and platform to stop at the selected position.

A magnetic extractor mechanism, automatically actuated when the platform has reached its destination, places the object upon the platform. The completion of the extractor cycle signals the carriage to move to a predetermined delivery point.

BACKGROUND

The invention relates generally to the retrieval of objects from storage, and more particularly to an apparatus for searching out, delivering, and returning such objects to a designated location.

The speedy retrieval of files, items of inventory or the like, has become increasingly important in our automated society. Compounding this problem is the ever-increasing number and complexity of records which must be kept, and the expanding number of inventory items or the like to be handled.

To meet these problems, industry is turning to mechanical retrieval and storing devices, which do the job in a fraction of the time, and at less cost, than human beings.

A common problem faced by such systems is how to accurately keep track of the physical position of the retrieving mechanism of the apparatus. In the past, this has been accomplished by continuously measuring the displacement of the retrieving mechanism from a fixed point. For this purpose, a transducing device which converts mechanical motion into electrical signals has been frequently employed.

A problem arises in the coupling of such transducing devices to the retrieving mechanism being positioned, in that a high degree of precision is required to insure proper correlation between the actual position of the mechanism and the electrical signals representing its position. When the mechanical displacement is in the order of tens or hundreds of feet, this problem of correlation becomes overwhelming.

OBJECTS OF THE INVENTION

It is, therefore, an object of this invention to overcome this problem by providing a system in which the position of the retrieving mechanism is evaluated in terms of its immediate surroundings, rather than by measuring its displacement from a given point.

It is a further objective of this invention to provide a high speed retrieval device capable of handling high inertial loads.

It is a further objective of this invention to provide a search and retrieval system which may easily be expanded in size.

It is a further objective of this invention to provide means for delivering a retrieved object to one or more designated locations.

It is a still further objective of this invention to provide a means for returning a retrieved object from any pick up position to its designated storage space.

SUMMARY OF THE INVENTION

Briefly, the invention is predicated upon the concept of remotely controlling a horizontally moving carriage and vertically moving platform mounted thereon by an arithmetic unit which is continuously fed sensing data available from scannable data adjacent carriage and platform positions. This data, which is in ascending-numerical order is compared arithmetically with stored keyboard information and the horizontal and vertical drive motor circuits are controlled with the "sign" of the answer.

Remote slow and stop commands pinpoint the positions of the carriage and platform. Logic within the vertical motor control circuit causes the platform to stop at a "slow" position associated with its destination and await the final positioning of the carriage before moving the platform to the "stop" position.

When the platform reaches the designated bin, a magnetic extractor mechanism is automatically actuated to engage the container within the selected bin and slide it onto the platform. Upon the completion of the extraction, the carriage and platform drive mechanisms are automatically actuated to deliver the retrieved object to a designated position.

The ability of the invention to handle high inertial loads is facilitated by the inclusion in the digital symbols of "slow" signals, which cause the drive motors to slow when the carriage and platform approach their target bin. The "slow" signals allow the retriever to decelerate prior to reaching its target, and therefore eliminates overshoot.

The above mentioned and other features and objects of this invention and the manner of attaining them will become more apparent and the invention itself will best be understood by reference to the following description of embodiments of the invention taken in conjunction with the accompanying drawings, the description of which follows.

BRIEF DESCRIPTION OF THE DRAWINGS

FIG. 1 is a perspective view of the retriever of the invention shown servicing bins in opposing vertical planes.

FIG. 2 is a perspective view of the carriage and platform of the invention.

FIG. 3 is a front view of the top carriage drive mechanism.

FIG. 4 is a top view of the platform.

FIG. 5 is a partial side view of the extractor housing.

DETAILED DESCRIPTION OF THE PREFERRED EMBODIMENT OF THE INVENTION

Figure 6:
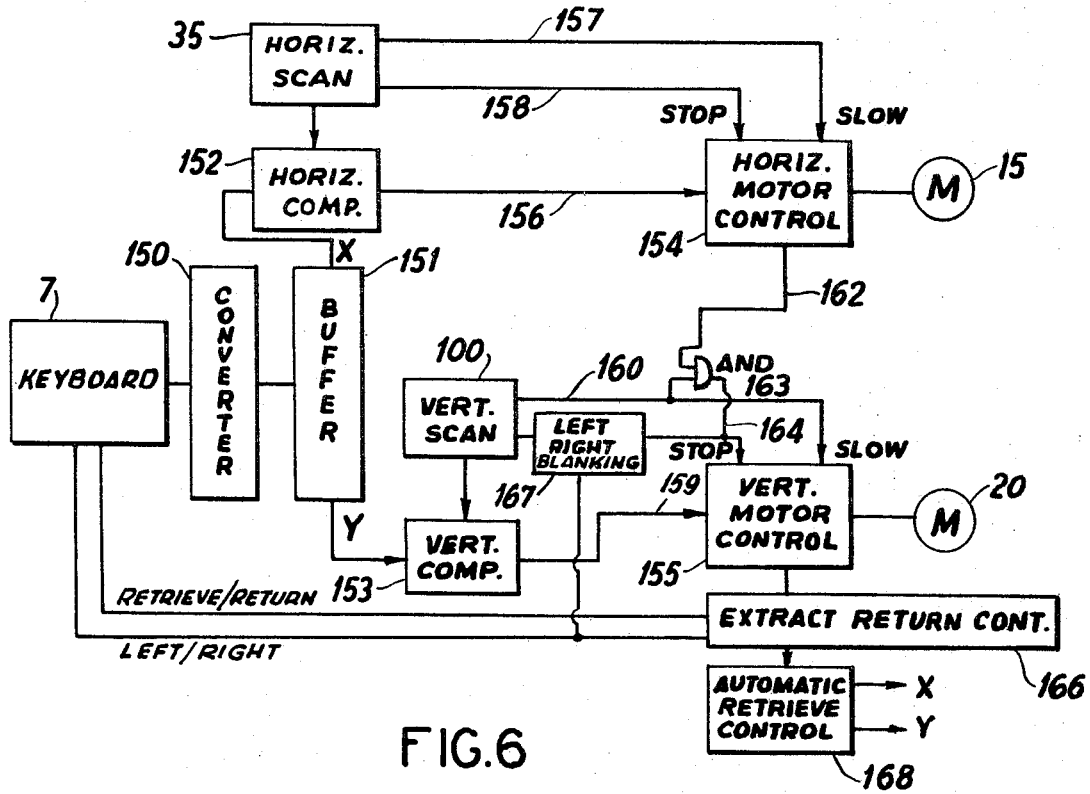
FIG. 6 is a block diagram of control circuitry of the invention.

The general organization of the invention is shown perspectively in FIG. 1. Two parallel racks 1 and 2, which contain vertical arrays of storage bins 3, are juxtaposed and spaced apart a distance determined generally by the bin size and specifically by the size of the items stored in the bins, and the space required for the retrieval mechanism. The bins are identified by binary decimal coded characters, arranged in ascending-numerical order vertically and horizontally, but not necessarily sequentially numbered.

The retrieval mechanism includes a carriage 4 which moves horizontally across the vertical faces of the storage racks, and a platform 5 which moves vertically upon the carriage. The carriage and platform are individually controlled, responding to the X and Y coordinates, respectively, of the bin selected for retrieval.

The system is controlled from a console 6 including a keyboard 7. For ease of access, the control circuitry may be incorporated in module form within storage area 21 of the console. Preferably, the console is situated at the end of one of the racks 1 and 2 adjacent a delivery pick-up position. Keyboard 7 includes 10 numeric keys (indicated generally at 11) for serially inserting the code number of the desired bin; a start button 9, retrieve and return buttons 10 and 12, respectively, for initiating the desired command and a clear key 9a for negativing errors.

The carriage is supported at the top and bottom by parallel sets of guide rails 13, 13' and 14, 14'. It is traversed by the carriage drive motor 15 which is positionally coupled to top and bottom transmissions 16 and 17 by connecting rods 18 and 19, respectively. As will be described, the carriage is driven simultaneously at the top and bottom. This avoids any tendency of the carriage to skew as a result of the effects of acceleration on its own weight, or the weight of its load, during the high speed retrieval cycle.

The platform 5 rides vertical members 22 and 23 of the carriage, and is driven by motor 20, attached to the base 34 of carriage 4, and the cable-pulley arrangement to be explained in connection with FIG. 2.

CARRIAGE

Referring now to FIGS. 1 and 2, carriage 4 is an open box-like structure, preferably constructed of aluminum or other light-weight material to reduce inertia. The carriage is guided at top and bottom by grooved wheels 30 and 31, respectively, which are rotatably mounted in the carriage top 33 and bottom 34 and engage top guide rails 13 and 13', and bottom rails 14 and 14' disposed parallel to the storage bins. The upper wheels 30 may be angularly disposed as shown with respect to guide rails 13 to restrain the carriage from lateral motion.

The carriage is powered by upper and lower transmissions 16 and 17, which in turn are driven by the rotating shafts 18 and 19 powered by motor 15 via transmission 26. The shafts are rotatably journalled in bearings 18' and 19' to reduce bending moments. The remote drive shaft ends terminate as shown in FIG. 3 in bevel gears 40 which drive rollers 44 through a flexible gear train including meshing gears 41 and 42 angularly displaceable as a unit with frame 43. Under the urging of spring 45, drive roller 44 is maintained in engagement with drive track 24. By forming the corresponding rollers and tracks of highly frictional clutch-type material, the desired degree of positive drive is effected to insure equal drive speed, top and bottom. Any tendency to skew or cock is automatically compensated by slippage.

As will be described, the carriage carries a horizontal scanner 35 affixed to its base 34 which is oriented downward to sense digitial code characters affixed to a code bar 37 positioned below the carriage and parallel to the guide rails 14 and 14'.

PLATFORM

Referring now to FIGS. 2 and 4, the platform 5 is an L-shaped structure, the vertical side 38 of which engages the forward vertical elements 22 and 23 of the carriage via four roller bearing groups 51 through 54 which strictly define the vertical platform motion and negative lateral displacement.

The platform is transported up and down on the carriage by a carriage mounted pulley arrangement. One end of a vertical drive cable 60 is attached by a tensioning means 61 (e.g., a turnbuckle) to the top of the carriage. Cable 60 is then led down to grooved pulley 63 mounted on the back of the vertical side 38 of the platform 5, then up and over idlers 64 and 65 at the top of the carriage, around idlers 66 at the base, and onto drive drum 67. Drive drum 67 is helically grooved to accommodate several turns of cable 60, which then leaves the drum, passes over idler 68 up over pulley 69 mounted below pulley 63 on the back of vertical side 38 of the platform 5, then down to the carriage base 34 where it is attached through a tension compensating means 70 (e.g., a spring). A vertical drive motor 20 is mounted on the carriage base 34 and drives the drum 67 in response to commands from the vertical motor control circuit to move the platform up and down. Drum 67 is slidably mounted upon drive shaft 20a of motor 20, so that it will align itself with cable 60 as it winds back and forth upon the drum during movement of the platform. Drum 67 is keyed to keyway 20b in shaft 20a to provide a positive rotational force.

While the foregoing is deemed sufficient for understanding the platform drive, reference may be made to my copending United States application, Ser. No. 681,259, filed Nov. 7, 1967, for details of similar type drives.

EXTRACTOR

Referring now to FIGS. 1, 4 and 5, the extractor includes a housing 80 which slides across the top face 81 of the horizontal shelf portion 82 of the platform. The housing contains an electro-magnet 83 whose function is to engage a magnetic plate 28 attached to the end of each bin container 27. The housing is guided across the shelf by pairs of grooved rollers 84 and 84' riding ribs 85 and 85', respectively. The ribs also serve to engage the bottom of the bin containers to guide it as it is slid into the shelf.

The housing 80 is traversed across the platform by means of drive motor 92 coupled via gear train 91 to lead screw 93. Engaging the lead screw is a half-nut 89 attached to the housing via arm 88 which extends through channel 86 in the shelf. Preferably, the half nut as well as the arm is Teflon-coated to reduce friction where it engages the side or bottom of the shelf.

Drive motor 92 responds to the extractor control circuit to move housing 80 right or left. Reversing switches 96 and 97 located respectively at the right and left ends of the housing track adjacent channel 86 serve to reverse the extractor when it reaches the edge of platform 82.

Limit switches 71 and 72 also adjacent channel 86 halt the extractor housing and container at a point sufficiently across the platform from the chosen bin to assure the positioning of the containers completely on the platform. The limit switch on the side of the platform to which the housing must move to pick up or return a container is deactivated by the extractor control circuit to permit the housing to pass by, as will be explained. For example, if the housing in FIG. 1 is ordered to extract a container from a bin in rack 1, limit switch 71 (see FIG. 4) will be deactivated. Housing 80 will then be stopped by limit switch 72 at the end of the extractor cycle. Both sets of switches are activated by the half nut 89 as it traverses the channel adjacent the switches.

THE SCANNER

Scanners 35 and 100 on the carriage and platform, respectively, are preferably of the electro-optical type responsive to relatively light and dark areas to induce electrical responses in phototransducers. Each scanner includes a plurality of optical read heads in a linear array of sensing positions. Sources of illumination transmit light onto the areas to be interrogated. If the particular area viewed is coated with retro-reflective tape, light is reflected off the surface of the tape and back to the read head where it is focused upon the transducer which converts the reflected light energy into electric energy. Suffice to say that such scanner senses a binary optical coding and transmits it to a control circuit where it is evaluated.

Further details and advantages of the preferred type optical scanner are set forth in my co-pending application entitled "Random Access Store For Cards, File Folders and the Like," filed Nov. 6, 1967, Ser. No. 680,642. Two scanners are contemplated; the first 35 sits under the carriage to read the horizontal coordinate and slow and stop commands on the floor. The second is mounted on the back of shelf 5 as illustrated in FIGS. 2 and 5. This scanner is divided into three sections 100, 100a and 100b. Section 100 contains those heads designated to sense the numerical position of the platform (as well as "slow" commands) and is directed at a code scale 103 affixed to the inside wall 104 of vertical member 23 of the carriage. Sectional 100a and 100b of scanner 100 are attached on opposite edges of shelf 82 to read the "stop" symbols of the code (FIG. 1, 206) affixed to the base of the bins in right and left racks 1 and 2.

POWER SUPPLY AND CONTROL CIRCUIT CONNECTION

Referring to FIGS. 1 and 2, the control circuitry for the carriage and platform motors and the extractor mechanism is housed in a compartment 21 in the control console 6. Power is supplied to the electrical components on the carriage, and control signals exchanged, through a wire bundle 110 leading from the console 6 to the carriage 4. This bundle may be fed out and retracted as the carriage moves by any one of several conventional means which will be familiar to those skilled in the art; however, the preferred means is by a flexible ribbon cable 110 disposed in a channel 111 under the carriage and lying parallel to the carriage guide rails 14 as illustrated in FIG. 2. The ribbons folds back upon itself as the carriage moves toward its origin. A small loop remains in the ribbon at the point of furthest displacement of the carriage to assure orderly doubleback when the carriage moves in. Further details of this arrangement may be had by reference to my co-pending application, Ser. No. 680,642, referred to above.

The umbilical cable or ribbon 110 is affixed to the carriage by terminal block 114 from which control and information leads are disseminated. For stationary parts lead wire dressing may take any form generally indicated by the art. An additional flexible link is, however, required for the leads going to the vertical scanner and extractor mechanism upon the platform. This link can be provided by attaching the vertical ribbon of leads 111 at its midpoint to a carriage-affixed elastic element (not shown) which will position the excess portion of wire clear of the moving elements of the retriever. The abutting housing 80 may be accommodated by a telephone type coiled cable 115 as illustrated in FIGS. 2 and 4.

THE CODE STRIPS

Figure 8:
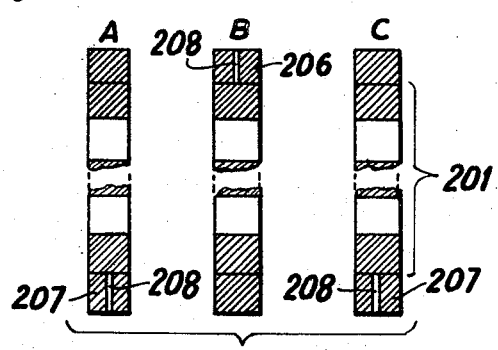
FIG. 8 is an illustration of the code strips of the invention.

The code utilized in this embodiment of the invention is illustrated in FIG. 8. Each position is identified along the horizontal and vertical axes by three code strips A, B and C. Each strip includes a series of reflective and non-reflective areas. The internal areas 201 are binary coded to represent digital bin designations. Preferably the code is in binary-decimal form; four binary "bits" for each decimal digit. The end areas 206 and 207 are non-reflective, but include longitudinally oriented narrow reflective lines 208 which serve two purposes. The first is to command a read by the associated read heads, thus assuring against a premature or ambiguous read. The second purpose is to signal the carriage and platform when to "slow" and where to "stop" when the identify code of the bin matches that of the destination. Strips A and C have read lines 208 in area 207, which is interpreted as a "slow" signal, while center strip B has a read line 208 in area 206 which is read as a "stop" signal. In other words, the particular read heads associated with these locations control designated functions as will be described.

The same type code is utilized by the vertical and horizontal scanner. In the vertical, however, the code strips are affixed to the carriage (see FIG. 4, 103) with the exception that the non-reflective block B, 206 containing the "stop" line 208 is positioned upon the racks (see FIG. 1, 206). This permits precise positioning relative the bin. The center code B meanwhile is available to identify the platform location quantitatively. The coded strips as thus utilized not only identify the desired bin, but also slow the carriage and platform and stop them in position.

OPERATION

The operation of the retrieval device of the invention will now be described with reference to the circuit block diagram of FIG. 6, in conjunction with the figures previously discussed.

In order to extract an item from among the vertically aligned racks 1 and 2, the device is first activated by pressing "start" button 9. The decimal number of the bin selected is then entered on keyboard 7. Each numeral so entered is forwarded to a decimal-to-binary converter 150 where the series decimal presentation is converted into a parallel binary-decimal form. Converter 150 can be any of the well-known types of decimal-to-binary converters and thus will not be discussed at length.

Logic within the keyboard evaluates the number entered to determine whether the selected bin is in rack 1 or 2, and pre-positions the extractor housing to retrieve or return to that side.

The subsequent depression of a "retrieve" button 10 simultaneously causes the converted code to be entered into a buffer store 151, and initiates the retrieving cycle. It is the function of the buffer store 151 to permit a comparison between the codes being ascertained by the read heads of the scanners and the entered code designating the position of the desired item, as will be described. The buffer store may, for example, comprise a single matrix of ferrite cores to be interrogated by the comparator.

If the number being inserted has been incorrectly entered, the operator may press a "clear" button 9a which will erase the buffer store and permit the reintroduction of the correct number.

Upon the actuation of "Retrieve" button 10, the read heads of the scanners 35 and 100 are activated by a read command signal, and thereupon transmit signals to their respective comparators 152 and 153 representative of their positions with respect to the storage bins. In response to these signals, the horizontal and vertical comparators 152 and 153, respectively, signal their respective motor control circuits 154 and 155 to advance the carriage and platform simultaneously and by the most direct route toward the selected bin (as will be explained). Both the carriage and platform advance at high slow speed until reaching a "slow" symbol of the selected bin. When an initial comparison is effected in the horizontal comparator 152, a signal is transmitted to the horizontal motor control circuit 154, via lead 156, rendering it responsive to the "slow" signal transmitted directly from horizontal scanner 35 via lead 157. In response to these signals, the horizontal motor control causes the carriage to be advanced at slow speed until the "stop" signal is detected and transmitted to the horizontal motor control circuit via lead 158. As the carriage will be proceeding at a slow speed when the "stop" signal is received, it may be stopped without overshoot when opposite the stop index "bit."

Simple AND gates coupling the slow/stop leads respectively with the comparator output may be employed in conjunction with conventional motor speed control circuits to effect the described result.

The motor speeds involved naturally depend upon torque considerations raised by the inertia of the load and the desire for critical damping.

When initial comparison is effected by the vertical comparator 153 (the last four binary bits, i.e., the last decimal digit may be allocated to describing the vertical coordinate) an appropriate signal is similarly transmitted to the vertical motor control 155, via lead 159, rendering it responsive to the "slow" signal transmitted directly thereto from vertical scanners 100 via circuit 160.

If the carriage has not come to its horizontal position at the time the platform reaches the first code stripe A or C at its designated level, the vertical motor control will cause the platform to stop upon receipt of a "slow" signal. If, on the other hand, the carriage has reached its destination by the time the platform reaches code stripe A or C at its designated level, the vertical motor control will cause the platform to slow and proceed to the "stop" index affixed to the bin. In this manner, the platform 5 is caused to await the arrival of the carriage 4 at its destination prior to proceeding from the "slow" mark on the carriage to the "stop" mark on the bin.

This holding action may be accomplished by combining an output 162 from the horizontal motor control, generated as long as the carriage 5 is moving, with the vertical "slow" signal 160 in an AND gate 163. The output 164 of AND gate 163 is a "hold" signal that will temporarily energize the platform motor stop control for as long as the carriage is moving. With the positioning of the carriage, output 162 ceases. The platform will then respond to the existing slow signal by moving slowly to the "stop" index on its designated bin.

Upon receipt of the platform "stop" signal, the vertical motor control 155 will actuate extractor control 166 which will initiate the extraction cycle.

Figure 7:
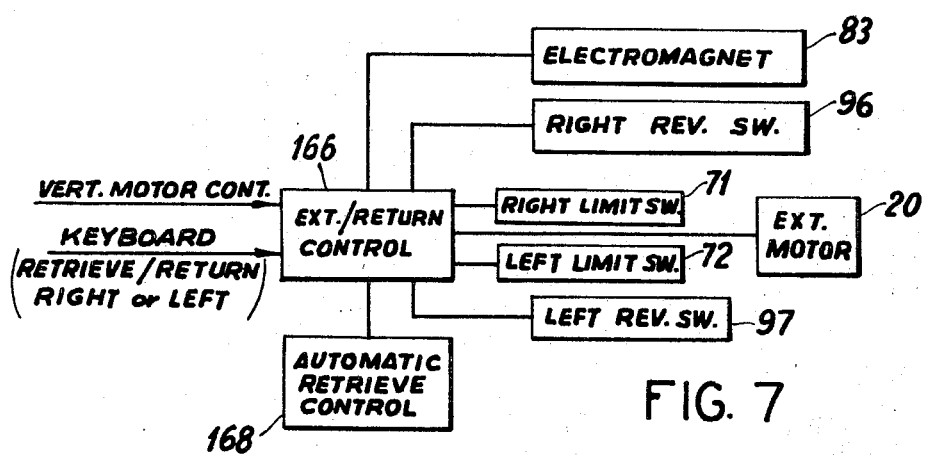
FIG. 7 is a block diagram of the extractor control circuitry.

The extractor control energizes electromagnet 83 and drives the lead screw motor 92 appropriately to move the housing to the left or right depending upon where the bin is located (see FIG. 7). This direction is easily designated by the first digit (1 left, 2 right), which, in addition to causing the housing to pre-position at the limit switch on the opposite side, commands the extractor motor direction and also blanks the unused scanner (100a or 100b) via blanking circuit 167 so that vertical height positioning is dependent upon the correct rack. The electromagnet and housing 80 is driven to the appropriate side and is reversed by one of the end limit switches 96 or 97 and returns the container over center to the appropriate remote inner limit switch 71 or 72. At this point, the electromagnet is disabled. The extractor return control 166 then triggers the automatic retrieve control 168 which applies stored coordinates of a receiving area to the buffer and reinitiates the cycle to transport the bin container at the reception area. Provision can be made for discharging the bin container at the reception area. The system is now quiescent until commanded to return a container.

To return a container to its bin, the bin location must first be entered in the keyboard. The extractor then cycles the housing to the side opposite the bin to permit the container to be introduced onto the platform on the side corresponding to its bin. When it has been so introduced, return button 12 is actuated and the apparatus cycles in the manner described returning the container to its designated location. This time, however, the electromagnet is deenergized. Upon completion of the return, the system is again quiescent; however, as the retriever is always positioned opposite vertical and horizontal strips, it is always aware of its position when energized, and signaling the comparators accordingly.

Circuitry for effectuating the simple logic described above for the extractor-return control circuit is well known and the specification will not be encumbered by its lengthy description. Those skilled in the art will also appreciate that safety switches may be included to signal the loss of the container during the extracting cycle, to ensure containers are not returned to "full" locations, to ensure that the extractor motor is not overloaded and so on.

OPERATION OF COMPARATORS

The outputs of the converter 150 are made available to the horizontal and vertical comparators 152 and 153 via buffer 151 which has portions devoted to each co-ordinate (as explained, the last binary-decimal digit is the vertical coordinate). Within each comparator the binary number representing the appropriate vertical or horizontal coordinate of the selected bin is compared to the scanner signal representing the actual position of the carriage or platform. A determination is made as to which number is larger, and a signal generated in response to this determination is employed to move the carriage or platform in the direction of the selected bin.

This determination can be made quite simply by successively comparing the binary digits commencing with the most significant until it is determined which number is larger. If the number of the chosen bin is larger than the carriage position number, a positive signal is transmitted to the horizontal motor control 154. The motor control circuit will respond to this signal by causing the drive motor to advance the carriage in the direction of higher numbered bins. If the number of the chosen bin is less than the position number of the carriage, a negative signal will be produced which will similarly result in the carriage being moved in the direction of the lower numbered bins.

An alternate method for generating control signals within the comparators would be to assign a negative sign to the desired bin number and then feed the two numbers into an adder/subtractor such as described in "High Speed Computer Devices"—Engineering Research Associates, McGraw-Hill, pages 283–284.

The output of the comparator will cease when the digital numbers being compared become the same. This absence-of-signal may be employed directly (or inverted in a monostable circuit) to signal the appropriate motor control circuit. As no directional change will be ordered by the comparators between slow and stop commands, drive motor control circuit may assume continuity of direction until receipt of the "stop" signal.

The invention as above described has distinct advantages over similar systems which employ position transducing devices to locate their retrieval mechanisms. The correlation question of whether the platform is actually in the position indicated by its tracker is eliminated. In the invention the position of the carriage and platform are determined by looking at symbols physically positioned opposite their associated bins. Each time the carriage or platform passes a digital symbol its position is updated, so that the number of bins which can be serviced is limited only by practical considerations exclusive of the positioning correlation problem. Further, directional control of the retrieval unit is simply effectuated by comparing the ascending numerical sequence arithmetically and controlling the drive motors with the sign of the answer.

While the principles of the invention have been described in connection with specific apparatus, it is to be clearly understood that this description is made only by way of example and not as a limitation to the scope of the invention as set forth in the objects thereof and in the accompanying claims.

What is claimed is:

1. In a system for retrieving items from a selected bin and including a plurality of bins arranged in numerically ascending order and accessible from a vertical plane, the improvement comprising:

retrieving means for removing an item from a selected bin and including a horizontally movable carriage and a vertically movable platform slidably mounted on said carriage;

control means for said retrieving means including means for entering and storing coded information identifying the selected bin in terms of its horizontal and vertical coordinates;

means for traversing said carriage horizontally and means for traversing said platform vertically at least said vertical traversing means including normal and slow speeds;

horizontal sensing means attached to said carriage for sensing first code means and vertical sensing means attached to said platform for sensing second code means;

code means uniquely identifying each bin's coordinate position in said plane, said code means comprising said first code means arranged substantially horizontally in the system for identifying a first coordinate and said second code means arranged substantially vertically for identifying a second coordinate, said second code means including coded strips, disposed on said carriage, identifying said coordinate and each including a slow command, and a coded strip disposed on said bins, and including a stop command;

comparing means coupled to said horizontal and vertical sensing means for comparing the code representing the position of said retrieving means with the code means representing the position of the selected bin and generating control signals in response thereto for controlling said horizontal and vertical traversing means and moving the retrieving means to said selected bin.

2. The system claimed in claim 1, wherein each said horizontal and vertical traversing means includes horizontal and vertical drive means and horizontal and vertical traversing control means respectively coupled between said drive means and said comparing means.

3. The system claimed in claim 1, including means mounted on said platform and responsive to a selected positioning of said carriage and platform for extracting and returning an item respectively from and to a selected bin.

4. The system claimed in claim 3, wherein said extractor means comprises;

housing slidably mounted on said platform;

means for shuttling said housing across said platform toward and away from said plane;

means on said extractor housing for engaging an item when shuttled adjacent thereto;

and extractor control means for cycling said extractor means to selectively remove and return items when said carriage and platform are positioned at a selected bin.

5. The system claimed in claim 4, wherein said extractor means includes:

switch means mounted on said platform, and responsive to the position of said housing for reversing the direction of movement of said housing when it reaches an item engaging position on said platform, and limit switches for stopping said housing at a preselected position on the platform upon the completion of an extraction cycle.

6. The system claimed in claim 1 wherein said second code means includes at least two code strips, affixed to said carriage and bracketing each coordinate platform position, said third code strip being disposed on said bin between said two strips.

7. The system claimed in claim 6, wherein at least said horizontal traversing means includes normal and slow speeds;

and wherein at least said first code means includes two code strips bracketing each coordinate carriage position identifying said coordinate and including a slow speed code command, and a third code between said two strips identifying the carriage stop position.

8. The system claimed in claim 1, wherein said codes are binary and said means for quantatively comparing the codes representing the positions of said retrieving means and the selected bin comprises;

means for successively comparing the most significant digits of the numbers representing the position of the retrieving means and the selected bin to determine which number is greater.

9. The system claimed in claim 1, wherein said comparing means includes a first comparator for comparing the horizontal code coordinate of the selected bin with the horizontal position of the carriage as sensed by said horizontal sensing means, and a second comparator for comparing the vertical code coordinate of the selected bin with the vertical position of the platform as sensed by said vertical sensing means.

10. The device of claim 9, wherein said first and second comparators simultaneously compare the sensed positions of said platform and said carriage with the coordinates of the selected bin, and generate control signals in response thereto for simultaneously controlling said horizontal and vertical traversing means.

11. The system claimed in claim 1 further including means responsive to the movement of said carriage horizontally for converting the platform slow command sensed by said sensing means to a stop command during the time when said carriage has not yet reached the horizontal coordinate stored in said storing means, and means for reinitiating the traversing of said platform vertically when said carriage reaches said horizontal coordinate.

12. The system claimed in claim 1 wherein said comparing means includes means for comparing said codes quantitatively for determining the direction of said selected bin.

References Cited

UNITED STATES PATENTS

| | | |
|---|---|---|
| 2,751,093 | 6/1956 | Theibault. |
| 2,988,237 | 6/1961 | Devol. |
| 3,049,247 | 8/1962 | Lemelson. |
| 3,076,566 | 2/1963 | Dennis. |
| 3,402,836 | 8/1968 | Debrey et al. |

GERALD M. FORLENZA, Primary Examiner

R. B. JOHNSON, Assistant Examiner